Dec. 5, 1939.   P. VAN SITTERT   2,182,416
ROTARY TOOL
Filed Aug. 11, 1937   2 Sheets-Sheet 1

PAUL VAN SITTERT
INVENTOR
BY
ATTORNEY

Dec. 5, 1939.　　　　P. VAN SITTERT　　　　2,182,416
ROTARY TOOL
Filed Aug. 11, 1937　　　2 Sheets-Sheet 2

PAUL VAN SITTERT
INVENTOR

BY
ATTORNEY

Patented Dec. 5, 1939

2,182,416

UNITED STATES PATENT OFFICE 2,182,416

ROTARY TOOL

Paul Van Sittert, Cleveland Heights, Ohio, assignor to The Cleveland Pneumatic Tool Company, Cleveland, Ohio, a corporation of Ohio Application August 11, 1937, Serial No. 158,493

7 Claims. (Cl. 192—30.5)

This invention relates broadly to rotary tools, but more particularly to fluid actuated reversible rotary tools of the impact type.

One object of this invention is to produce a rotary tool or motor especially fitted for setting or removing nuts, bolts or the like, and constituting a simple assembly which is strong, durable and efficient.

Another object of this invention is to produce a rotary tool adapted to engage the work for normally rotating the same, the tool being equipped with clutch means automatically disengageable when the torque reaches a predetermined resistance, allowing thereby the tool to accumulate rotative energy to be transmitted to the work upon the automatic reengagement of the clutch means resulting from a reduction in the torque resistance applied to the motor.

Another object of this invention is to produce a tool of the type aforesaid wherein the operative driving unit is mounted within a housing movable relative to the handle of the tool, thereby preventing sudden jars to be transmitted to the handle of the tool.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific combination of parts and specific constructions indicative of the scope and spirit of the invention.

Figure 1:
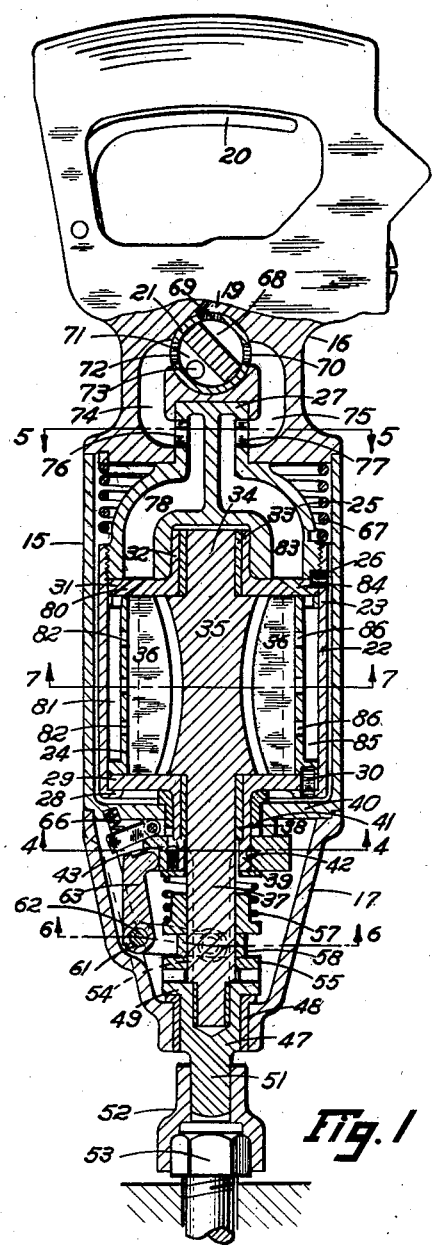
Fig. 1 is a longitudinal sectional view of a rotary tool embodying the invention.

Referring to the drawings in which like symbols designate corresponding parts throughout the several views, 15 represents a shell housing having mounted on its upper end a handle 16 and on its lower end a front housing 17 which are secured in position by four long bolts 18. Within the handle 16, there is an inlet port 19 having motive fluid admitted therein and controlled by a throttle valve (not shown) operable by a trigger 20. The port 19 leads to a four way valve 21 rotatable within the handle 16.

Rotatably mounted within the shell housing 15, there is a rotor housing or stator generally designated by 22 and comprising a sleeve 23 and an insert 24. The upper end of the sleeve is internally threaded to receive a cap 25 which is locked to the sleeve by a pin 26. The cap 25 has an upper shafted end portion 27 journaled within the handle 16. The lower end of the sleeve 23 is turned inwardly to form a rest 28 for a bearing plate 29. This bearing plate, the sleeve 23 and the insert 24 are locked together against relative rotation by any suitable means such as a pin 30. Interposed between the lower end of the cap 25 and the upper end of the insert 24, there is another bearing plate 31 also locked to the sleeve 23 by the pin 26. This plate has a shank end portion 32 pressed into the cap 25 and accommodating a bushing 33 within which is journaled the upper shafted end portion 34 of a rotor 35 which is rotatably mounted within the insert 24.

The rotor 35 is of the usual type mounted eccentrically relative to the center axis of the insert 24 and carrying radially slidable blades 36 engageable with the inner wall of the insert. Depending from the rotor 35, there is an integral shafted end 37 extending into the front housing 17 and journaled within a bushing 38, which is pressed within a sleeve 39 formed integral with the lower plate 29 and extending therefrom through the end wall 40 of the shell housing 15 into the front housing 17. This sleeve 39 is laterally supported by a bushing 41 disposed through the shell housing's end wall 40.

Figure 4:
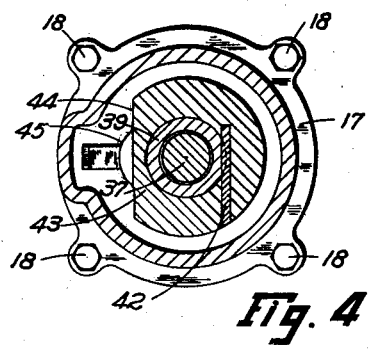
Fig. 4 is a cross sectional view taken in a plane indicated by line 4—4 in Fig. 1.

Secured to the lower end of the sleeve 39 by a cross pin 42, there is a disk or cam 43 formed with a flat land 44 (see Fig. 4) and an arcuated land 45 having its upper edge beveled as at 46.

The extreme lower end of the shaft or spindle 37 is journaled within a driven clutch member 47 rotatably mounted within a bushing 48 extending through the front end of the front housing 17. This clutch member has its inner end formed with an annular flange 49 resting on the bushing 48 and having two diametrically disposed jaws 50 extending upwardly, while its outer end forms a polygonal stem 51 having a socket member 52 locked thereon against relative rotation and adapted to engage the work such as a nut 53.

Above the clutch member 47, the spindle 37 is provided with longitudinally disposed splines 54 having slidable thereon, in interlocking engagement therewith, a driving clutch member 55 formed on its lower end with two diametrically opposed jaws 56. Constantly urging this driving clutch member toward the driven clutch member 47 for operative interengagement of the jaws 56 and 50, there is a compression spring 57 acting on the driving clutch member 55.

Intermediate its ends, the driving clutch member 55 is formed with an annular groove 58 having rotatable therein two diametrically opposed rollers 59 carried by a fork-like arm 60 of a bell crank lever 61, which is pivotally mounted on a cross pin 62 carried by the front housing 17. This lever has another arm 63 shaped for end engagement with the flat land 44 of the cam 43. The outer end of the arm 63 is also provided with a step 64 adapted to receive the free end of a pawl 65 pivotally carried by the lower end wall 40 of the shell housing 15, and urged into engagement with the arm 62 by a compression spring 66. The pawl 65 is made to ride the bevel edge 46 of the cam arcuated land 45.

Disposed around the cap 25, within the upper end of the shell housing 15, there is a torsional spring 67 having one end secured to the handle 16 while the other end is affixed to the cap 25.

Figure 5:
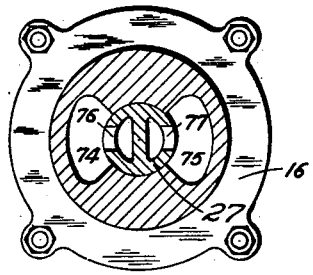
Fig. 5 is a cross sectional view taken in a plane indicated by line 5—5 in Fig. 1.
Figure 6:
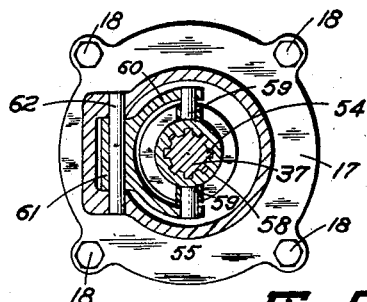
Fig. 6 is a cross sectional view taken in a plane indicated by line 6—6 in Fig. 1.
Figure 8:
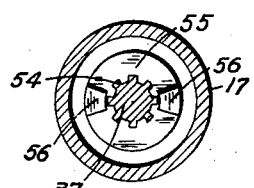
Fig. 8 is a cross sectional view taken in a plane indicated by line 8—8 in Fig. 2.
Figure 9:
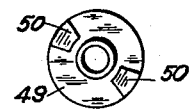
Fig. 9 is a top plane view of one clutch member shown in Figs. 1 and 2.

The four way valve 21 is provided with one inlet chamber 68 having two radial ports 69 and 70 opening thereinto, and an exhaust chamber 71 having a radial port 72 leading therefrom, and another port 73 connecting the chamber 71 to the atmosphere. Leading from the valve 21, there are two diametrically opposed ports 74 and 75 formed within the handle 16. In the shafted part 27 of the cap 25, there are provided two radial ports 76 and 77 opening into the ports 74 and 75 respectively. As shown in Figs. 5, the ports 74 and 75 are materially larger than the corresponding ports 76 and 77, allowing thereby limited relative rotation between the handle 16 and the cap 25 without affecting the communication of the ports. From the port 76, there exists a communication with the interior of the stator through ports 78 and 80, a cavity 81 provided between the sleeve 23 and insert 24, and a plurality of radial ports 82. Leading similarly from the port 77 into the rotor chamber, there are the ports 83 and 84, the cavity 85 and the radial ports 86.

Figure 2:
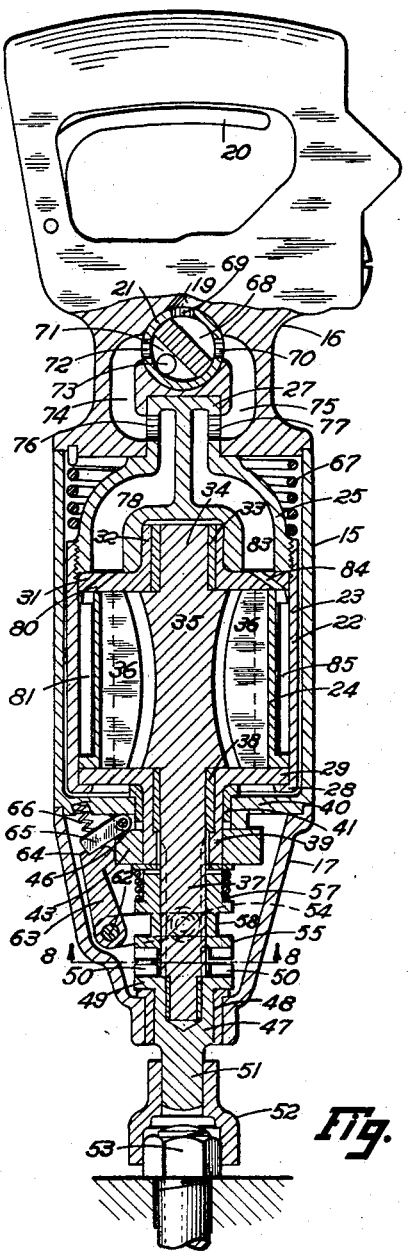
Fig. 2 is a view similar to Fig. 1, showing parts in a different position.

In the operation of the tool, let it be assumed that motive fluid is admitted to the four way valve 21 through the port 19, and that the valve is positioned as shown in Figs. 1 and 2 with the driving clutch member 55 operatively engaging the driven member 49 as shown in Fig. 1. In this instance, the motive fluid will flow through the valve 21 via the port 69, the chamber 68 and the port 70, and therefrom into the cavity 85 through the ports 75, 77, 83 and 84. From the cavity 85, the motive fluid will flow into the rotor housing or stator 22 through the ports 86, wherein it will act on the blades 36 for imparting rotation to the rotor 35 in a counterclockwise direction in Fig. 7. After acting on the blades, the motive fluid is free to exhaust from the rotor chamber via the ports 82, the cavity 81, the ports 80, 78, 76 and 74, and finally through the valve port 72, the exhaust chamber 71 and the exhaust port 73.

The rotation imparted to the rotor 35 is of course transmitted to its integral shaft 37 and therefrom to the driving clutch member 55 which is splined on the shaft. When the driving clutch member is in operative engagement with the driven clutch member 47, that is, with the jaws 56 of the former engaging the jaws 50 of the latter, rotation is transmitted to the driven clutch 47 and therefrom to the work or nut 53 through the socket 52. This constant rotation imparted to the work will continue until the work is subjected to a predetermined torque resistance tending to retard the rotation speed of the motor or rotor 35. When the rotor 35 is subjected to an increased resistance to rotation, which increase may be either gradual or sudden, the motive fluid normally acting on the blades 36 will increase in pressure and cause a partial rotation of the stator 22 in a direction adverse to that of the rotor, thereby winding the torsional spring 67. This recoil movement of the rotor housing relative to the stationary shell housing 15, the handle 16 and the front housing 17, will also be transmitted to the cam 43 which is keyed to the sleeve 39 of the lower bearing plate 29, thus causing the cam, or more particularly its flat land 44, to move the arm 63 of the bell crank lever 61 away from the center axis of the tool into the position shown in Fig. 2. This outward movement of the arm 63 will result in the upward movement of its companion arm 60, and the consequential disengagement of the driving clutch member 55 from the driven clutch member 47. In this position of the arm 63, the pawl 65 riding the bevel edge of the arcuated land 45 will be free to assume the position shown in Fig. 2, that is in engagement with the step 64 of the arm 63 for maintaining the driving clutch member 55 out of engagement with the driven clutch member 47.

Due to the disengagement of the clutch members, the torque resistance previously applied on the rotor will be released, allowing the rotor 35 to gradually regain its normal speed and thereby reducing the back pressure of the motive fluid acting on the stator 22. As this back pressure is gradually reduced, the torsional spring 67 will impart a partial rotation to the rotor housing 22 in a counterclockwise direction in Fig. 7, thereby causing the rotor housing to again assume its original position as shown in Fig. 1. During this partial rotation of the rotor housing 22, the arm 63 is maintained in clutch released or inoperative position until the pawl 65 is again engaged by the summit of the arcuated land 45 and moved thereby into the position shown in Fig. 1. This release of the arm 63 is calculated to take place immediately before the stator 22 reaches its normal position, assuring thereby the rotor 35 to regain its normal speed before the release of the arm 63 takes place.

When the arm 63 is released from the pawl 65, the flat land 44 of the cam 43 is positioned as shown in Fig. 1, allowing the driving clutch member 47, through the effort of the compression spring 57, to slide downwardly on the splined shaft 37 for sudden reengagement of the driving clutch jaws 56 with the corresponding clutch jaws 50 of the driven clutch member. Since the driving clutch member 55 is rotatably driven by the shaft 37, the sudden reengagement of the clutch jaws 50 and 56 will impart a rotative impact to the work receiving socket 56, and consequently to the work 53.

In order to produce a powerful rotative impact of the driving clutch member 55 on the driven clutch member 47, the rotor 35 is especially designed to weigh as much as possible for a tool of a given size, thus causing the rotor to act as a fly-wheel. Due to the momentum of this rapidly rotating fly-wheel, it will be understood that the rotative impact transmitted to the socket 52 is greater than that resulting from the rotation of a lighter rotor used generally in tools of this type. Furthermore, after the work or nut 53 is initially set, the sudden load imparted to the rotor 35 upon the reengagement of the clutch members 55 and 47, will cause a sudden increase of the motive fluid pressure acting on the rotor, which increased pressure will immediately thereafter be capable of release for imparting to the rotor an additional rotative power cooperating with the momentum of the heavy rotor for setting the work.

From the foregoing description, it will be understood that immediately after the reengagement of the clutch members, the arm 63 will again be moved in clutch disengaging position, allowing the rotor to again regain its normal speed for delivering a rotative impact to the work in the manner above described.

Figure 3:
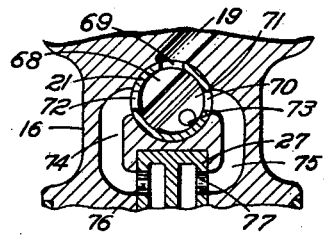
Fig. 3 is a fragmentary view of Fig. 1, showing one part in a different position.

When it is desired to rotate the rotor in the other direction for removing the nut 53 instead of setting it, the four way valve 21 may be positioned as shown in Fig. 3. In this instance, the motive fluid is free to flow through the valve ports 70, 68 and 69, from where it will be admitted into the stator 22 through the series of ports previously conveying the exhausting fluid, including the ports 82. Once in the rotor chamber, the motive fluid will act on the blades 36 for rotating the rotor in a clockwise direction in Fig. 7. Simultaneously the motive fluid is exhausting from the rotor through the ports 86, and the series of ports previously used for conveying motive fluid into the rotor chamber, including the port 75 now connected with the valve port 72, the exhaust chamber 71 and the exhaust port 73.

Figure 7:
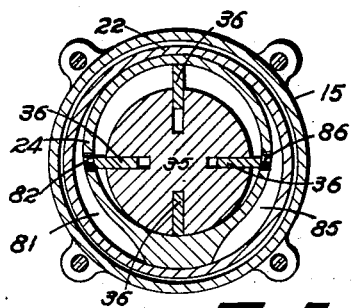
Fig. 7 is a cross sectional view taken in a plane indicated by line 7—7 in Fig. 1.

During the rotation of the rotor 35 in a clockwise direction in Fig. 7, the action of the mechanism will be identical to the one above described, thereby producing a reversible motor capable of imparting a rapid succession of rotative blows or impacts to the work engaged by the motor.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a tool of the character described, a fluid motor including a handle, a housing, connecting means between said handle and housing enabling relative movement therebetween, a rotor within said housing, passages admitting motive fluid into said housing for normally driving said rotor and effecting said relative movement under certain conditions of operation, a work engaging member, rotation transmitting clutch means between said rotor and member capable of release to enable relative rotation therebetween, and means operatively associated with said clutch means deriving motion from said relative movement for effecting said release.

2. In a tool of the character described, a fluid motor including a rotor, a housing for said rotor capable of limited rotation relative thereto, supporting means for said housing enabling said relative rotation, said housing having motive fluid admitted therein normally driving said rotor and effecting said limited rotation under certain conditions of operation, a work engaging member, rotation transmitting clutch means between said rotor and member capable of release to enable relative rotation therebetween, and means operatively associated with said clutch means deriving motion from said limited rotation for effecting said release.

3. In a tool of the character described, a fluid motor including a rotor, a housing for said rotor capable of oscillatory movement relative thereto, supporting means for said housing enabling its oscillatory movement, said housing having motive fluid admitted therein normally driving said rotor and effecting limited rotation of said housing in one direction when said rotor is subjected to an abnormal torque resistance, spring means effecting the return of said housing after the release of said abnormal torque resistance, a work engaging member, rotation transmitting clutch means between said rotor and member capable of release to enable relative rotation therebetween, and means operatively associated with said clutch means responsive to the oscillatory movement of said housing for effecting the release and enabling subsequent reengagement of said clutch means.

4. In a tool of the character described, a fluid motor including a rotor, a housing for said rotor capable of oscillatory movement relative thereto, supporting means for said housing enabling its oscillatory movement, said housing having motive fluid admitted therein normally driving said rotor and effecting limited rotary movement of said housing in one direction under abnormal conditions of operation, spring means effecting subsequent return movement of said housing, a work engaging member, rotation transmitting clutch means between said rotor and member movable into operative or inoperative position, means operatively associated with said clutch means responsive to the rotary movement of said housing for shifting said clutch means into inoperative position, and locking means retaining said clutch means into inoperative position releasable by virtue of the return movement of said housing for enabling movement of said clutch means into operative position.

5. In a tool of the character described, a rotary motor including a stator and a handle capable of relative rotation, a power actuated rotor within said stator, a rotatable member, a rotation transmitting connection between said rotor and member including clutch means movable into and out of operative engagement, a spring normally urging said clutch means into operative engagement, and clutch means actuating means deriving motion from said relative rotation in one direction for shifting said clutch means into inoperative position and responsive to said relative rotation in the other direction to enable operative reengagement of said clutch means by said spring.

6. In a tool of the character described, a power actuated rotatable driving member, a rotatable driven element subjected to normal and abnormal torque resistances, rotation transmitting clutch means between said member and element capable of release to enable relative rotation therebetween, yielding means urging and normally maintaining said clutch means into operative engagement, a cam actuated in one direction by virtue of an abnormal torque resistance of said element to effect the release of said clutch means, and locking means to retain said clutch means in released position, said cam being actuated in the other direction by virtue of a normal torque resistance of said element to effect the release of said locking means.

7. In a tool of the character described, a power actuated rotatable driving member, a rotatable driven element, rotation transmitting clutch jaws between said member and element capable of release to enable relative rotation therebetween, yielding means urging said clutch jaws into operative engagement, cam means automatically actuated under certain conditions of operation for effecting the release of said clutch jaws, locking means operatively associated with said clutch jaws to retain them in released position, and locking means releasing cam means automatically actuated during other conditions of operation for enabling reengagement of said clutch jaws.

PAUL VAN SITTERT.